US012112539B2

(12) United States Patent
Wang et al.

(10) Patent No.: US 12,112,539 B2
(45) Date of Patent: Oct. 8, 2024

(54) VIDEO PROCESSING METHOD, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Qi Wang, Beijing (CN); Zhifan Feng, Beijing (CN); Hu Yang, Beijing (CN); Chunguang Chai, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 508 days.

(21) Appl. No.: 17/450,158

(22) Filed: Oct. 6, 2021

(65) Prior Publication Data
US 2022/0027634 A1 Jan. 27, 2022

(30) Foreign Application Priority Data

Nov. 27, 2020 (CN) .......................... 202011358245.3

(51) Int. Cl.
G06V 20/40 (2022.01)
G06F 18/22 (2023.01)
(Continued)

(52) U.S. Cl.
CPC ............. *G06V 20/46* (2022.01); *G06F 18/22* (2023.01); *G06F 18/25* (2023.01); *G06N 3/045* (2023.01);
(Continued)

(58) Field of Classification Search
CPC ...... G06V 20/46; G06V 10/806; G06V 20/48; G06V 20/49; G06F 18/22; G06F 18/25;
(Continued)

(56) References Cited

U.S. PATENT DOCUMENTS 10,628,486 B2 * 4/2020 Chu .................... G06F 16/7837
2018/0082127 A1 * 3/2018 Carlson ............... G06F 18/2323
(Continued)

FOREIGN PATENT DOCUMENTS

CN 106682108 A 5/2017
CN 107589828 A 1/2018
(Continued)

OTHER PUBLICATIONS

Duan FF, Meng F. Video shot boundary detection based on feature fusion and clustering technique. IEEE Access. Nov. 26, 2020;8: 214633-45. (Year: 2020).*

(Continued)

Primary Examiner — Fayyaz Alam
(74) Attorney, Agent, or Firm — MORRISON & FOERSTER LLP

(57) ABSTRACT

A video processing method, an electronic device and a storage medium are provided, and relate to the field of artificial intelligence, and particularly relates to the fields of deep learning, model training, knowledge mapping, video processing and the like. The method includes: acquiring a plurality of first video frames, and performing fine-grained splitting on the plurality of first video frames to obtain a plurality of second video frames; performing feature encoding on the plurality of second video frames according to multi-mode information related to the plurality of second video frames, to obtain feature fusion information for characterizing fusion of the multi-mode information; and performing similarity matching on the plurality of second video frames according to the feature fusion information, and obtaining a target video according to a result of the similarity matching.

12 Claims, 6 Drawing Sheets

...... successive other video frames

(51) Int. Cl.
*G06F 18/25* (2023.01)
*G06N 3/045* (2023.01)
*G06V 10/80* (2022.01)

(52) U.S. Cl.
CPC ............ *G06V 10/806* (2022.01); *G06V 20/48* (2022.01); *G06V 20/49* (2022.01)

(58) Field of Classification Search
CPC .... G06F 18/253; G06N 3/045; H04N 21/845; H04N 5/265; H04N 21/4402; H04N 21/854
See application file for complete search history.

(56) References Cited

U.S. PATENT DOCUMENTS

| | | | | |
|---|---|---|---|---|
| 2019/0147105 | A1* | 5/2019 | Chu | G06N 3/044 386/241 |
| 2020/0279398 | A1* | 9/2020 | Sha | G06V 10/82 |
| 2022/0148313 | A1* | 5/2022 | Huang | G10L 25/57 |

FOREIGN PATENT DOCUMENTS

| | | |
|---|---|---|
| CN | 110798752 A | 2/2020 |
| CN | 111428590 A | 7/2020 |
| CN | 111783709 A | 10/2020 |
| JP | H0944639 A | 2/1997 |
| JP | 2011124681 A | 6/2011 |
| WO | WO-2007052395 A1 | 5/2007 |

OTHER PUBLICATIONS

Dumont E, Quénot G. Automatic story segmentation for tv news video using multiple modalities. International journal of digital multimedia broadcasting. 2012;2012. (Year: 2012).*
Gabeur et al., (2020). "Multi-modal Transformer for Video Retrieval," Lecture Notes in Computer Science, vol. 12349, 18 pages.
Su et al., (2020). "Multi-modal Video Scene Segmentation Algorithm Based on Deep Network," Journal of Wuhan University of Technology (Information & Management Engineering), 42(3), 7 pages. English abstract.
Extended European Search Report received for European Patent Application No. 21201637.2 mailed on Mar. 25, 2022, 7 pages.
Liu (2020). "Research on the Application of Human Brain Cognition and Cross-media Analysis and Inference Technology in Education," Jilin Publishing Group Co., pp. 90-93. English translation, 27 pages.
Office Action received for Japanese Patent Application No. 2021-166004 issued on Dec. 6, 2022, 7 pages. English translation.
Tanno, (2020). "Using Multimodal Deep Learning for Classification of Drive Recorder Data," The Journal of The Institute of Image Information and Television Engineers, 74(1):44-48, 9 pages. English translation.

* cited by examiner

VIDEO PROCESSING METHOD, ELECTRONIC DEVICE AND STORAGE MEDIUM

CROSS-REFERENCE TO RELATED APPLICATION

This application claims priority to Chinese patent application No. 202011358245.3, filed on Nov. 27, 2020, which is hereby incorporated by reference in its entirety.

TECHNICAL FIELD

The present disclosure relates to the field of artificial intelligence, and in particular to the fields of deep learning, model training, knowledge mapping, video processing and the like.

BACKGROUND

Electronic devices like portable devices and mobile phone terminals etc. are more intelligent than before, and the parsing capabilities of chips are stronger, especially video information parsing, picture rendering, and the like are faster and clearer than before, so that the requirement of users on the video image quality is higher than before. In particular for high-timeliness scenes (such as a parade scene, sports events, real-time video live broadcasting and the like), the users want to capture wonderful pictures of each video in moments, which requires more accurate and clearer video pictures.

SUMMARY

The present disclosure provides a video processing method, apparatus, an electronic device and a storage medium.

According to an aspect of the present disclosure, a video processing method is provided, including:
  acquiring a plurality of first video frames, and performing fine-grained splitting on the plurality of first video frames to obtain a plurality of second video frames;
  performing feature encoding on the plurality of second video frames according to multi-mode information related to the plurality of second video frames, to obtain feature fusion information for characterizing fusion of the multi-mode information; and
  performing similarity matching on the plurality of second video frames according to the feature fusion information, and obtaining a target video according to a result of the similarity matching.

According to another aspect of the present disclosure, a video processing apparatus is provided, including:
  a splitting module configured for acquiring a plurality of first video frames, and performing fine-grained splitting on the plurality of first video frames to obtain a plurality of second video frames;
  an encoding module configured for performing feature encoding on the plurality of second video frames according to multi-mode information related to the plurality of second video frames, to obtain feature fusion information for characterizing fusion of the multi-mode information; and
  a video processing module configured for performing similarity matching on the plurality of second video frames according to the feature fusion information, and obtaining a target video according to a result of the similarity matching.

According to another aspect of the present disclosure, an electronic device is provided, including:
  at least one processor; and
  a memory communicatively connected to the at least one processor; wherein,
  the memory stores instructions executable by the at least one processor, and the instructions are executed by the at least one processor to enable the at least one processor to execute the method provided by any embodiment of the present disclosure.

According to another aspect of the present disclosure, a non-transitory computer-readable storage medium storing computer instructions is provided, wherein the computer instructions are used for causing the computer to execute the method provided by any embodiment of the present disclosure.

It should be understood that the content described in this section is not intended to identify the key or important features of the embodiments of the present disclosure, and is not intended to limit the scope of the present disclosure. Other features of the present disclosure will be easily understood through the following description.

BRIEF DESCRIPTION OF THE DRAWINGS

The accompanying drawings are used to better understand technical solution(s) of the present disclosure and should not be constructed a limitation to the present disclosure. Wherein.

DETAILED DESCRIPTION

The exemplary embodiments of the present disclosure will be described below in combination with the accompanying drawings, including various details of the embodiments of the present disclosure to facilitate understanding, which should be considered as exemplary only. Therefore, those skilled in the art should realize that various changes and modifications can be made to the embodiments described herein without departing from the scope and spirit of the present disclosure. Likewise, descriptions of well-known functions and structures are omitted in the following description for clarity and conciseness.

The term "and/or," as used herein, is merely an association relationship that describes an associated object, and means that there can be three relationships. For example, A and/or B can represent three cases of A existing alone, A and B existing simultaneously, and B existing alone. The term "at least one," as used herein, means any one of the plurality or any combination of at least two of the plurality, e.g., including at least one of A, B, and C, that can represent including any one or more elements selected from the group consisting of A, B, and C. The terms "first" and "second," as used herein, mean a plurality of similar technical terms and are used to distinguish among the plurality of similar technical terms, and are not meant to limit the order or to limit only two. For example, a first feature and a second feature mean two types of features/two features, wherein there can be one or more first features, and there can also be one or more second features.

Further, in the following specific implementations, numerous specific details are set forth in order to better describe the present disclosure. It will be understood by those skilled in the art that the present disclosure can be implemented without some of the specific details. In some instances, methods, means, elements and circuits well known to those skilled in the art will not be described in detail so as to highlight the subject matter(s) of the present disclosure.

Video splitting is secondary processing of traditional television media programs due to the requirement of an Internet video and new media short video content platform, that is, a piece of original complete program content is split into a plurality of videos according to a certain logic thinking or a specific need. Main sources of the Internet video content include programs of traditional television media, video finished products of various organizations and movie and television works of movie and television companies. By splitting these videos, valuable information can be mined deeply, and can be re-edited to be used for interactive network televisions (IPTV), OTTs, mobile phone televisions and new media short video platforms, to meet the requirements of fragmentation of audio-visual program in new media, which is a new attempt and exploration in a video and audio editing industry.

Figure 1:
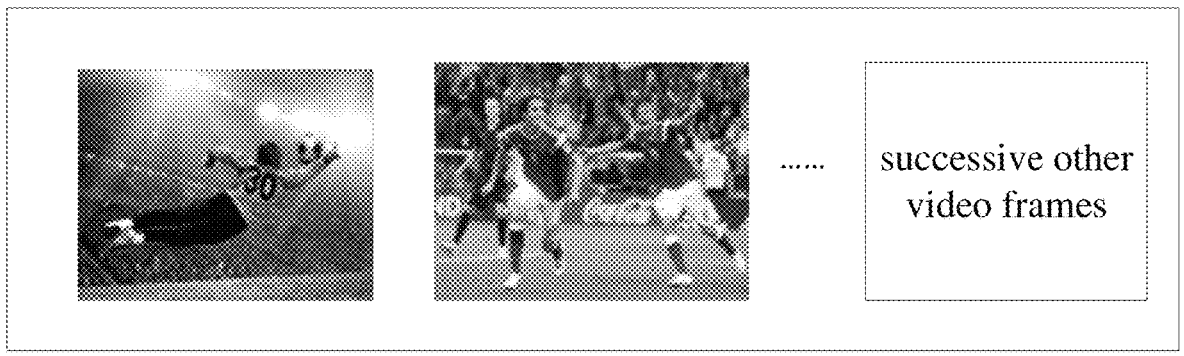
FIG. 1 is a schematic diagram of a plurality of video frames of a high-timeliness scene for a video processing according to an embodiment of the present disclosure.

The traditional manual video splitting technology is performing the clipping and video splitting on a video by manpower, the processing time is long, the capacity is improved slowly in the case of a large number of videos, so that the technology cannot be applied to scenes with high timeliness and the like, which not only consumes a large amount of time and experience, but also cannot meet the requirements of economic cost and timeliness. For non-manual video splitting techniques, such as a non-machine learning traditional video splitting algorithm, although video splitting can be performed based on hue and block matching, only visual information between pictures and shots is taken into account, and the content information of video frames cannot be fully understood. Another example is a video splitting technology based on machine learning. In this technology, through the video splitting can be performed based on a clustering method (including extraction of key frames, description of image features, clustering and the like), the continuity of video events is not taken into account, such that for videos that multi-shot continuous transformations exists in some scenes with relatively frequent shot switching (such as wonderful moments constituted by a plurality of video frames in a sporting event shown in FIG. 1 and the like) or scenes with complex events, the effect of video splitting is poor, and the accuracy rate of video splitting is low.

Figure 2:
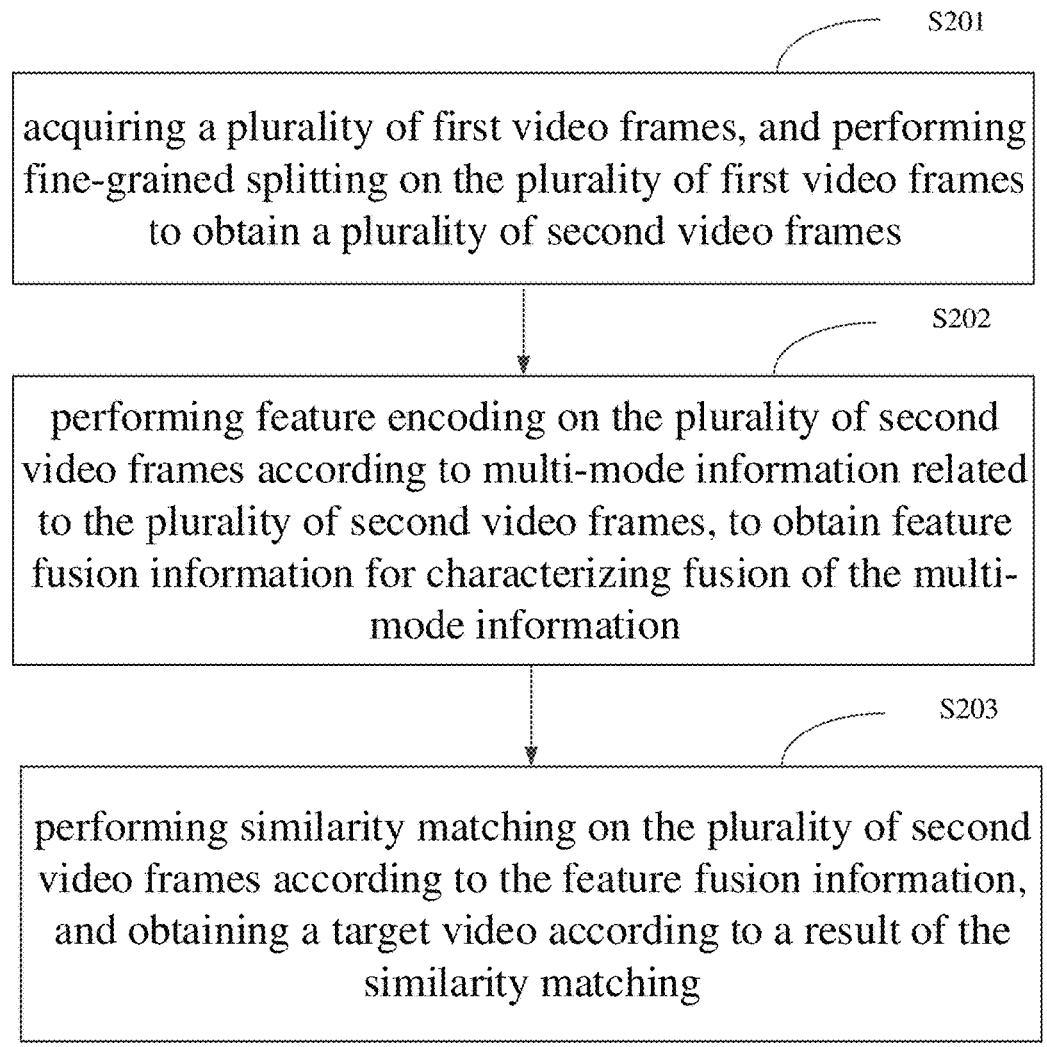
FIG. 2 is a schematic flow diagram of a video processing method according to an embodiment of the present disclosure.

According to an embodiment of the present disclosure, a video processing method is provided. FIG. 2 is a schematic flow diagram of a video processing method According to an embodiment of the present disclosure. The method can be applied to a video processing apparatus. For example, in a case that the apparatus can be deployed to be executed by a terminal or a server or other processing devices, video frame splitting, video frame feature encoding, video frame similarity matching can be performed to obtain a final target video, etc. Wherein, the terminal can be user equipment (UE), a mobile device, a cellular phone, a cordless phone, a personal digital assistant (PDA), a handheld device, a computing device, a vehicle-mounted device, a wearable device, etc. In some possible implementations, the method can also be implemented by a processor invoking computer-readable instructions stored in a memory. As shown in FIG. 2, the method includes:

S201, acquiring a plurality of first video frames, and performing fine-grained splitting on the plurality of first video frames to obtain a plurality of second video frames;

S202, performing feature encoding on the plurality of second video frames according to multi-mode information related to the plurality of second video frames, to obtain feature fusion information for characterizing fusion of the multi-mode information; and S203, performing similarity matching on the plurality of second video frames according to the feature fusion information, and obtaining a target video according to a result of the similarity matching.

In S201, the fine-grained splitting can be performed on the plurality of first video frames according to a parameter for characterizing shot and color transformation to obtain the plurality of second video frames. From the perspective of shot: splitting for the video edge, parameters for characterizing the shot and color transformation can include: performing the video splitting based on block matching in the video, performing the video splitting based on a statistical decision, performing the video splitting based on a two-threshold comparison (by setting a comparison of two thresholds to distinguish whether there is a shot mutation or shot gradient), etc. From the perspective of color transformation, the parameters for characterizing the shot and color transformation can include performing the video splitting based on hue.

In S202, feature extraction and feature fusion processing can be performed on the plurality of second video frames according to the multi-mode information to obtain the feature fusion information. Wherein, the feature fusion processing refers to that a plurality of neural network models or a neural network model integrated into multifunctional extraction can be used as an expert model, to respectively perform feature extraction on the multi-mode information related to the second video frames. Wherein, the multi-mode information includes: at least one of knowledge map information, the text information, the audio information, the hue information, the object information, and the action information.

In S203, similarities of the plurality of second video frames can be scored according to the feature fusion information, and a result of the scoring is taken as the result of the similarity matching; in a case that the result of the similarity matching is that adjacent video frames for a same event content are similar, video merging is performed on the adjacent video frames until completing merging of the plurality of second video frames according to the adjacent video frames, respectively, and the target video is obtained according to a result of the video merging.

Adopting the present disclosure, a plurality of first video frames can be acquired, and fine-grained splitting is performed on the plurality of first video frames to obtain a plurality of second video frames. Feature encoding can be performed on the plurality of second video frames according to multi-mode information related to the plurality of second video frames, to obtain feature fusion information for characterizing fusion of the multi-mode information. Similarity matching is performed on the plurality of second video frames according to the feature fusion information, and a target video can be obtained according to a result of the similarity matching. Since the feature encoding can be performed based on the multi-mode information to obtain information containing more details of the video content, the target video obtained according to the similarity matching is more precise, thereby improving the accuracy of the video splitting.

In an example, S201-S203 described above can be implemented by a video splitting module, a multi-mode feature encoding module, a similarity matching module (primarily performing similarity matching on adjacent video segments), and a video frame splicing module. Specifically, after a plurality of first video frames input into the video splitting module are acquired, the fine-grained splitting can be performed on the acquired plurality of first video frames according to the shot and color transformation to obtain a plurality of second video frames. Feature encoding (such as feature extraction and feature fusion of the multi-mode information) is performed on the plurality of second video frames input into the multi-mode feature encoding module according to the multi-mode information, to obtain feature information fused with the multi-mode information. The feature information is input into the similarity matching module to perform the video similarity matching to obtain a result of the similarity matching (such as a result of scoring a similarity). In a case that the result of the similarity matching is that two adjacent video frames for a same event content are similar, based on the strategy of restoring video segments in the same event, the video merging is performed on the two adjacent video frames for the same event content by the video segment splicing module, to obtain a final result of the video splitting of video processing. Because the similarity matching for the same event content pays more attention to the similarities on the details of the video content, the video splitting is more accurate, greatly improving the accuracy of the final result of the video splitting.

In an implementation, the method further includes: identifying the multi-mode information from the plurality of second video frames according to a pre-trained first neural network model.

In an example, the first neural network model can be composed of a plurality of expert models or can be a neural network integrated with respective functions of a plurality of expert models. Taking the first neural network model that is a neural network integrated with respective functions of a plurality of expert models as an example, the first neural network model can include: a knowledge map extractor, a text extractor, an audio extractor, a hue extractor, an object extractor, and an action extractor. Wherein, knowledge map information (such as knowledge features) can be identified according to a knowledge map extractor (or referred to as a knowledge map-based structured tag embedding extractor) in the first neural network model; text information (such as text features) can be identified according to a text extractor (or referred to as a text-based text embedding extractor) in the first neural network model; audio information (such as audio features) can be identified according to an audio extractor (or referred to as an audio-based audio embedding extractor) in the first neural network model; hue information (such as RGB features) can be identified according to a hue extractor (or referred to as an image-based RGB extractor) in the first neural network model; object information (such as object features) can be identified according to an object extractor (or referred to as an object detection-based object feature extractor) in the first neural network model; and, action information (e.g., action features) can be identified according to an action extractor (an action identification-based action embedding extractor) in the first neural network model. Wherein the multi-mode information includes: at least one of the knowledge map information, the text information, the audio information, the hue information, the object information, and the action information.

Adopting this implementation, the intelligent video splitting technology of the present disclosure and a plurality of expert models based on machine learning are combined, to implement feature identification, feature extraction and feature fusion of multi-mode information. Furthermore, similarity comparison is achieved for the fused feature information (referred to as feature fusion information), so that more sufficient video content detail information can be obtained to deeply understand video content and event knowledge, and then the most precise result of the video splitting is obtained, greatly improving the accuracy of the final result of the video splitting.

In an implementation, the multi-mode information can be identified and extracted from the plurality of second video frames according to a pre-trained first neural network model, such as a video feature extraction model F (u). Respective types of information in the multi-mode information can be distinguished according to a second neural network model, such as a video feature identification model M(u). The time sequence information related to the multi-mode information is identified and extracted according to a third neural network model, such as an extraction model T(u) of time sequence information corresponding to a video, the time offset representation of the video feature extraction is recorded, and output results of the first neural network model, the second neural network model and the third neural network model are fused to obtain the above feature fusion information. Since the feature fusion information can describe more details of the video content, this can help to improve the matching speed and precision during subsequent similarity comparison, so that the final result of the video splitting of video processing obtained after similarity matching is performed on two adjacent video frames of the same event content is more precise, and the video splitting is more accurate, greatly improving the accuracy of the final result of the video splitting.

Application Example

Figure 3:
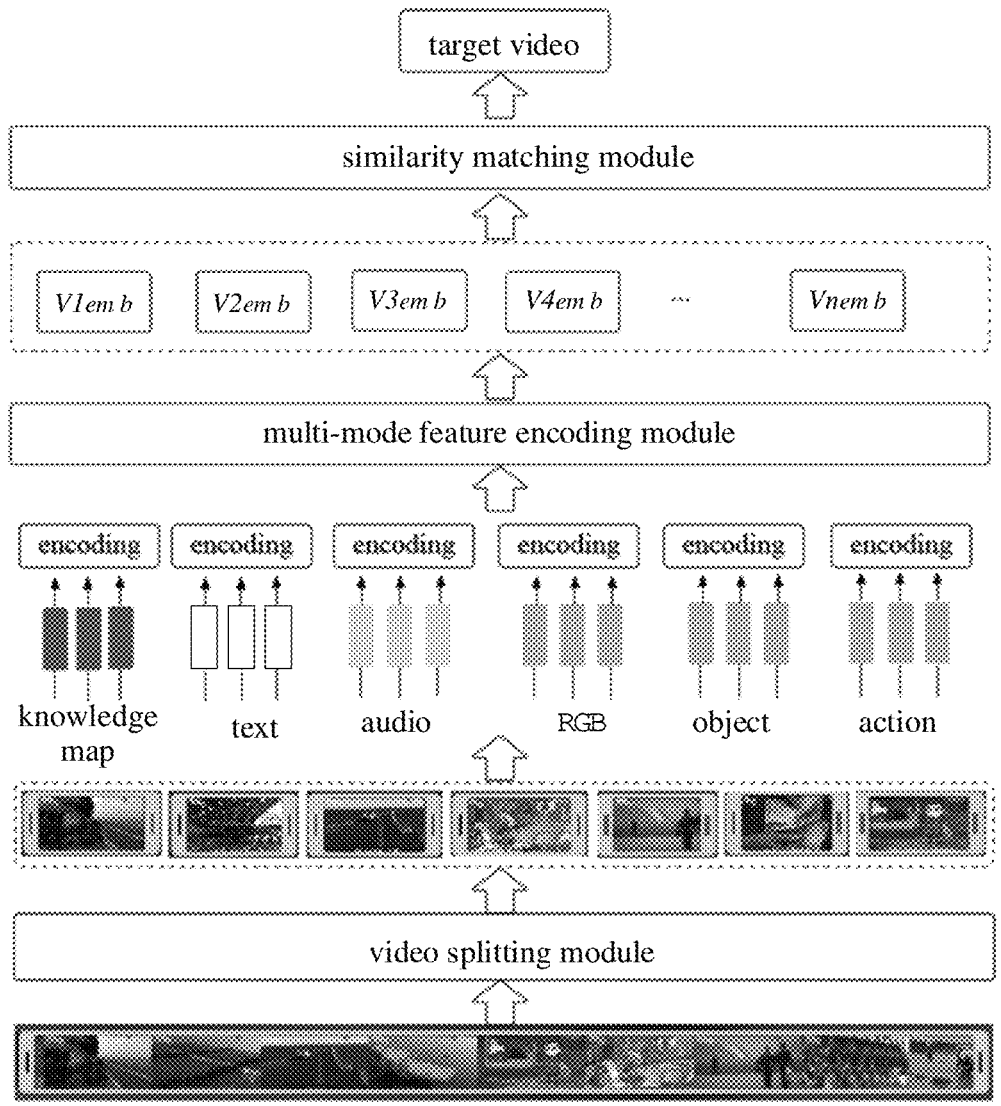
FIG. 3 is an architectural diagram of a system module implementing a video processing method according to an embodiment of the present disclosure.

The processing flow applying the first embodiment of the present disclosure includes the following content:

FIG. 3 is an architectural diagram of system modules configured for implementing a video processing method according to an embodiment of the present disclosure. Based on a system constituted by a video splitting module (mainly performing fine-grained splitting on a video according to shot and color transformation), a multi-mode feature encoding module (mainly performing feature encoding on the video by using multi-mode information), and a similarity matching module (the similarity matching is mainly performed on the adjacent video segments, and then the video merging can also be performed on the video segments according to the same event content to obtain a final result of the video splitting), the intelligent video splitting flow of the present disclosure can be implemented. The video content and event knowledge are deeply understood by fusing multi-mode information, and the video is split by combining depth learning. As shown in FIG. 3, this includes the following content:

I. Video Splitting Module

Fine-grained splitting of the video segments can be implemented by the video splitting module. The principle of the fine-grained splitting mainly includes: (1) splitting based on a hue, wherein the gray difference between two frames can be directly calculated, and if the total frame difference is larger than a certain set threshold, a shot mutation exists; (2) splitting based on an edge, wherein edge characteristics can be used for shot segmentation; the overall displacement between frames can be first calculated, registration is performed based on this, and then the number of edges and locations of the edges are calculated; (3) splitting based on block matching, wherein taking a block matching shot adopted by the non-compressed video as an example, a motion smoothness measurement can be adopted to detect the change of the shot; (4) splitting based on a statistical decision, wherein a statistical decision model is established by using a motion compensation feature and an adaptive threshold manner, a time sequence shot mutation mode and shot length distribution information of a video sequence, such that the shot detection error rate can be reduced to the lowest through a criterion derived by the statistical decision model; 5) splitting based on a two-threshold comparison, wherein two thresholds (e.g. Tb, Ts) can be set. In a case that the frame difference is larger than Tb, there is a shot mutation; and in a case that the frame difference is less than Tb and greater than Ts, there is a shot gradient. In a case that the frame difference for a successive frame starts to exceed Ts, this frame is called as a start frame for the shot gradient, and so on.

II. Multi-Mode Feature Encoding Module

Figure 4:
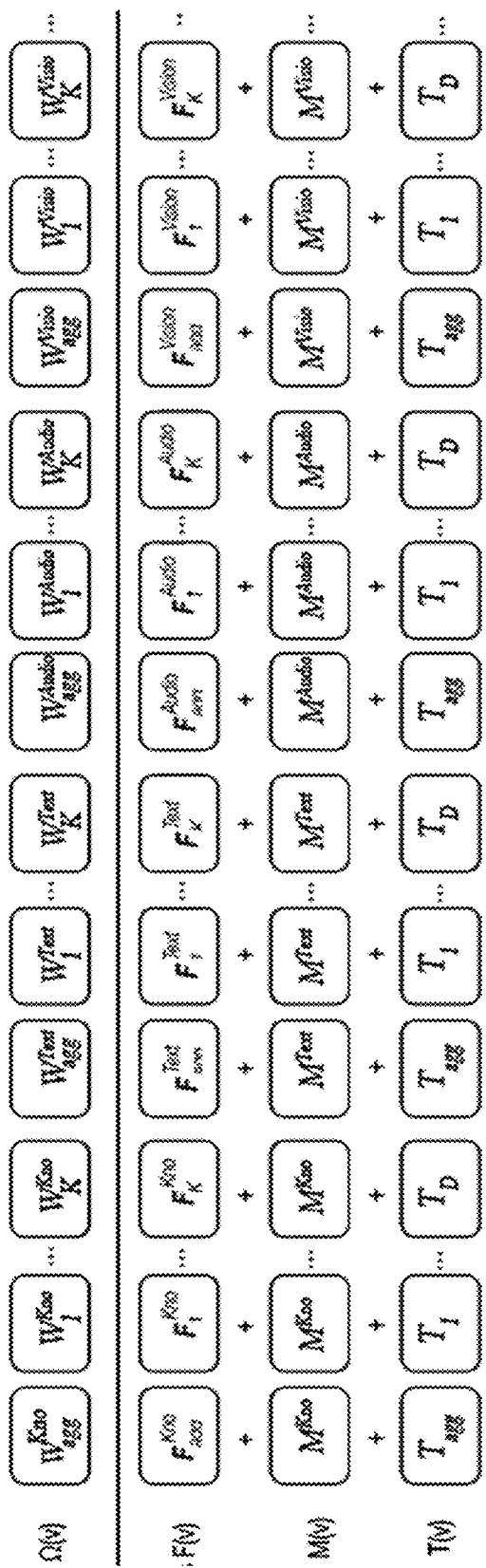
FIG. 4 is a schematic diagram of implementing feature encoding based on multi-mode information according to an embodiment of the present disclosure.

FIG. 4 is a schematic diagram of implementing feature encoding based on multi-mode information according to an embodiment of the present disclosure. The multi-mode feature encoding mainly obtains several expert embeddings through a plurality of expert models, and multi-mode information depiction and feature extraction of the whole video are completed through these expert embeddings. As shown in FIG. 4, this includes the following content:

The video-level embedding representation is derived from an example of a multi-mode feature encoding module, such as a multi-modual transformer (MMT). The MMT can follow the architecture of a Transformer encoder, the Transformer encoder consisting of stacked self-attention mechanism layers and fully connected layers. An input $\Omega(v)$ to the MMT is a set of embedding representations, all dimensions being the same, defined as $d_{model}$ dimensions, and each embedding of which represents a set of feature representations. The input is shown in a formula (1):

$$\Omega(v) = F(v) + M(v) + T(v) \qquad (1).$$

Wherein the meaning of each parameter in the formula (1) is described as follows:

$\Omega(v)$ represents embedding output after video frame feature encoding;

F(v) represents a video feature extraction model used for extracting multi-mode information in a video; wherein $F_{agg}^{kno}$, $F_1^{kno}$ ... $F_K^{kno}$ represents extracting knowledge map information (such as a knowledge feature), "kno" is an abbreviation of the knowledge feature, "k" represents a dimension of an embedding, and "agg" represents an average embedding; by analogy, text information (such as a text feature), audio information (such as an audio feature), hue information (such as an RGB feature), object information (such as an object feature) and action information (such as an action feature) can be extracted respectively;

M(v) represents a video feature identification model used for distinguishing different types of information in the multi-mode information;

T(v) represents an extraction model of time sequence information corresponding to a video, and is used for extracting and recording the time sequence information (i.e. a timing embedding) to record a time offset representation of the feature extraction;

$T_{agg}$, $T_1$ ... $T_D$ wherein represents the extracted time sequence information, and "D" represents the number of seconds.

With regard to the above multi-mode information extracted by F(v), in order to learn an effective representation from different inherent forms in video data, the above multi-mode information can be extracted by using various expert models as video feature extractors; wherein the various expert models mainly include a knowledge map-based structured tag embedding extractor, a text-based text embedding extractor, an audio-based audio embedding extractor, an image-based RGB extractor, an object detection-based object feature extractor and an action identification-based action embedding extractor. The feature fusion is performed on the above multi-mode information respectively extracted by various expert models, so that the video information can be comprehensively characterized in various content dimensions. Through the feature fusion, based on the relationship among the above multi-mode information extracted by the learned different expert models, and using the cross mode and the long-sequence time relationship for joint representation, more accurate video content details can be obtained by using different pre-trained expert models $\{F^n\}_{n=1}^{N}$.

Each expert model is trained by a specific task and then used for feature extraction of multi-mode information. For a video u, each expert model can extract a sequence including K features, denoted as: $F^n(v) = [F_1^n, \ldots, F_k^n]$.

Feature characterization of a video is extracted by various expert models. Since different expert models are used for performing the feature extraction, in order to map the extracted features (or referred to as feature embedding) of different expert embeddings to a general $d_{model}$ dimension, N linear layers (one extracted by each expert) can be used to project all the features to $\mathbb{R}^{d_{model}}$.

A transformer encoder generates one embedding for each of its feature inputs, thereby providing multiple embedding representations for multiple features. To obtain a unique embedding representation for each feature, a summary embedding $F_{agg}^n$ can be defined that contextualizes the collected features (gathering the current representations) and initializes this embedding by maximum pooling: $F_{agg}^n$=maxpool($\{F_k^n\}_{k=1}^N$), and then the form of the entire input Feature sequence is shown in a formula (2):

$$F(v)=[F_{agg}^1, F_1^1, \ldots, F_K^1 \ldots, F_{agg}^N, F_1^N \ldots, F_k^N] \quad (2).$$

In the formula (2), N represents the number of expert models (N is a positive integer greater than 1), and K represents the dimension of the embedding (K is a positive integer greater than 1).

With regard to distinguishing different types of information in multi-mode information through M(v), in order to better process and distinguish the multi-mode information, MMT needs to distinguish input of which expert model the current processed embedding is originated from, and can learn N $d_{model}$ dimension embeddings $\{E_1, \ldots, E_n\}$ to distinguish the embedding representations of different experts. The sequence of embeddings of the expert model to the video encoder takes the form shown in a formula (3) below:

$$E(v)=[E^1, E^1, \ldots, E^1, \ldots, E^N, E^N, \ldots, E^N] \quad (3).$$

In the formula (3), N represents the number of expert models (N is a positive integer greater than 1).

With regard to recording the time sequence information by T(u), the time information from which each feature extracted into the MMT in the video is originated is provided. A video can have a maximum duration of $t_{max}$ seconds, taking "second" as a measurement parameter to learn a $d_{model}$ dimensional D=$|t_{max}|$ in seconds, such as $\{T_1, \ldots, T_D\}$. Each expert mode feature extracted in the time range [t, t+1] will be denoted as $T_{t+1}$. For example, features extracted in video in 2.2 seconds will be time encoded by temporal embedding $T_3$. Two additional temporal embeddings $T_{agg}$ and $T_{unk}$ are learned to encode the aggregate feature and the unknown time information feature, respectively. Finally, the sequence of temporal embeddings T takes the form shown in a formula (4) below:

$$T(v)=[T_{agg}, T_1, \ldots, T_D \ldots, T_{agg}, T_1, \ldots, T_D] \quad (4).$$

In the formula (4), $T_{agg}$ represents an average embedding for time information, and $T_D$ represents time information at the $D^{th}$ second (D is a value greater than 1 second).

The implementation of the MMT is shown in the following formula (5):

$$\psi_{agg}(v)=\text{MMT}(\Omega(v))=[\psi_{agg}^1, \ldots, \psi_{agg}^N] \quad (5).$$

In the formula (5), N represents the number of expert models, while $\psi_{agg}(v)$ represents the video summary information. $\Omega(v)$ represents the input to the MMT.

III. Similarity Matching Module

Figure 5:
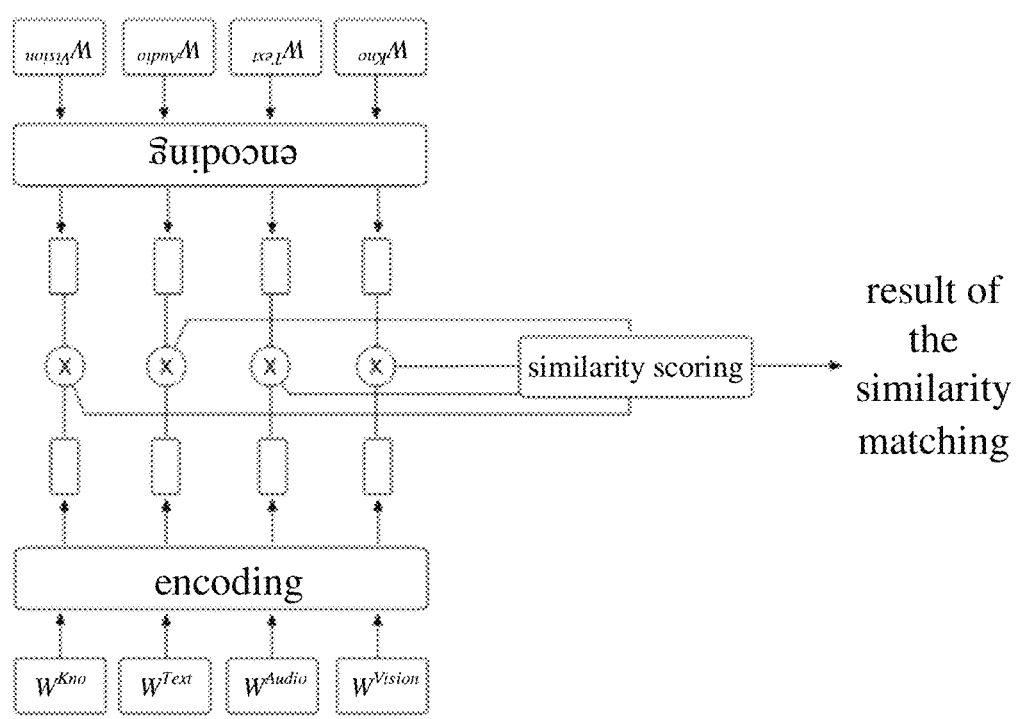
FIG. 5 is a schematic diagram of similarity matching according to an embodiment of the present disclosure.

FIG. 5 is a schematic diagram of similarity matching according to an embodiment of the present disclosure. The similarity calculation between two adjacent video segments is mainly completed based on a similarity matching module, and the similarity matching adopts an up-and-down symmetrical module design. The similarity scoring is obtained by calculating the similarity among embeddings of a plurality of expert models and by using a weight operation (the weight can be automatically learned through an attention mechanism), to obtain a result of the similarity matching. A loss function can adopt a bi-directional max-margin ranking loss function, as shown in the following formula (6):

$$\mathcal{L} = \frac{1}{B}\sum_{i=i}^{B}\sum_{j\neq i}[\max(0, s_{ij} - s_{ii} + m) + \max(0, s_{ji} - s_{ii} + m)]. \quad (6)$$

In the formula (6), $\mathcal{L}$ represents the above loss function, B represents a batch size for batch processing of samples, $s_{ij}$=similarity($v_i$, $v_j$), $s_{ij}$ represents similarity between two video segments, and m is a margin and can take a value of (0,1).

Figure 6:
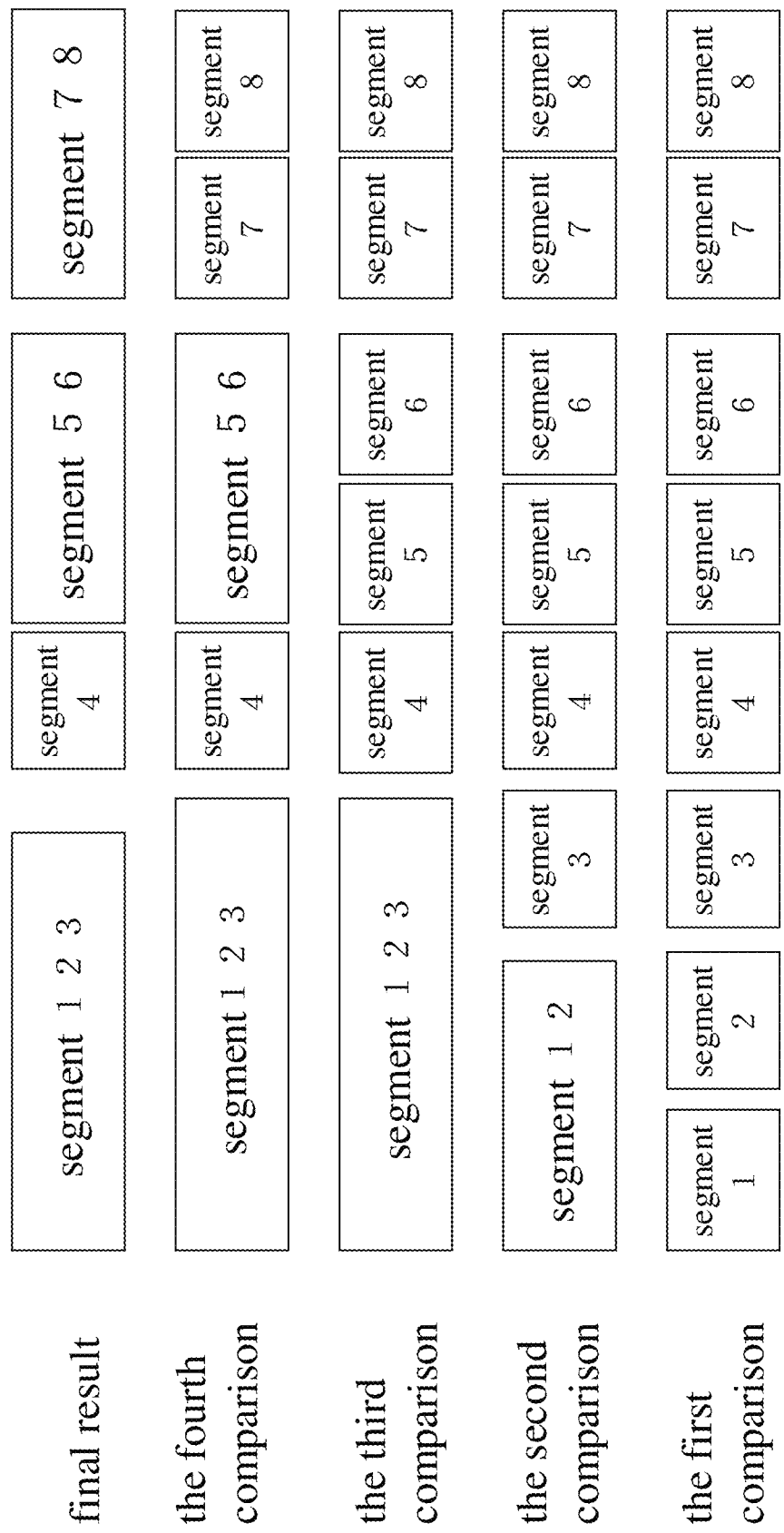
FIG. 6 is a schematic diagram of video merging according to an embodiment of the present disclosure.

IV. a similarity matching module or a video frame splicing module new added after the similarity matching module on the basis of the above FIG. 3 specially used for video splicing processing FIG. 6 is a schematic diagram of video merging according to an embodiment of the present disclosure. Taking a similarity matching module integrating the video splicing processing as an example, as shown in FIG. 6, merging and splicing of adjacent video segments can be implemented through the similarity matching module. Video segments in the same event are mainly restored, and if the two adjacent video segments are determined to be similar, the two videos are merged; and comparisons are sequentially performed to obtain a final result of the video splitting.

Adopting the present disclosure example, information of a plurality of expert models used for extracting multi-mode information can be fused, and the multi-mode information is captured and fused, so that the whole video content is depicted comprehensively, and the presentation effect of a video picture is improved; large-scale and large-batch video splitting can be performed in a deep learning mode, the whole process is more efficient and lower in cost, and high-timeliness video requirements are met; by combining a KG-based structured tag technology (such as entities, topics and the like), a text-based representation technology, vision-based (RGB, Object, Action) and the like, the video can be split from the perspective of a video content, to solve the problem of poor splitting effect caused by frequent switching of multiple shots; the application example has strong expandability, the use scene is not limited to a video technology, and the application example can be applied to any video similarity matching scene: such as video fingerprint identification, video short band length, same video matching and the like.

Figure 7:
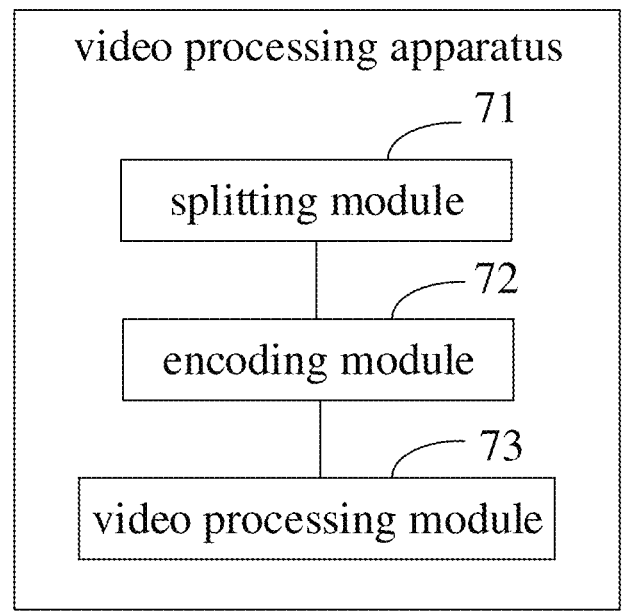
FIG. 7 is a schematic diagram of a composition structure of a video processing apparatus according to an embodiment of the present disclosure.

According to an embodiment of the present disclosure, a video processing apparatus is provided. FIG. 7 is a schematic diagram of a composition structure of a video processing apparatus according to an embodiment of the present disclosure. as shown in FIG. 7, the apparatus includes: a splitting module 71 configured for acquiring a plurality of first video frames, and performing fine-grained splitting on the plurality of first video frames to obtain a plurality of second video frames; an encoding module 72 configured for performing feature encoding on the plurality of second video frames according to multi-mode information related to the plurality of second video frames, to obtain feature fusion information for characterizing fusion of the multi-mode information; and a video processing module 73 configured for performing similarity matching on the plurality of second video frames according to the feature fusion information, and obtaining a target video according to a result of the similarity matching.

In an implementation, the splitting module is further configured for performing the fine-grained splitting on the plurality of first video frames according to a parameter for characterizing shot and color transformation to obtain the plurality of second video frames.

In an implementation, the encoding module is further configured for performing feature extraction and feature fusion processing on the plurality of second video frames according to the multi-mode information to obtain the feature fusion information.

In an implementation, the video processing module is further configured for scoring similarities of the plurality of second video frames according to the feature fusion information, and taking a result of the scoring as the result of the similarity matching; and in a case that the result of the similarity matching is that adjacent video frames for a same event content are similar, performing video merging on the adjacent video frames until completing merging of the plurality of second video frames according to the adjacent video frames, respectively, and obtaining the target video according to a result of the video merging.

In an implementation, the apparatus further includes an identification module configured for identifying the multi-mode information from the plurality of second video frames according to a pre-trained first neural network model.

In an implementation, the identification module is further configured for: identifying knowledge map information according to a knowledge map extractor in the first neural network model; identifying text information according to a text extractor in the first neural network model; identifying audio information according to an audio extractor in the first neural network model; identifying hue information according to a hue extractor in the first neural network model; identifying object information according to an object extractor in the first neural network model; identifying action information according to an action extractor in the first neural network model; the multi-mode information includes: at least one of the knowledge map information, the text information, the audio information, the hue information, the object information, and the action information.

In an implementation, the apparatus further includes a fusion module configured for: distinguishing respective types of information in the multi-mode information according to a second neural network model; identifying time sequence information related to the multi-mode information according to a third neural network model; and fusing output results of the first neural network model, the second neural network model, and the third neural network model to obtain the feature fusion information.

The function of each module in each apparatus of the embodiment of the present disclosure can be referred to the corresponding description in the above method, and will not be described in detail herein.

According to an embodiment of the present disclosure, the present disclosure also provides an electronic device and a readable storage medium.

Figure 8:
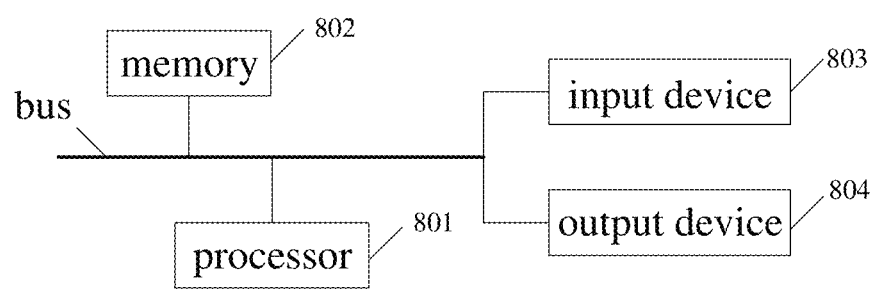
FIG. 8 is a block diagram of an electronic device used to implement the video processing method of an embodiment of the present disclosure.

As shown in FIG. 8, FIG. 8 is a block diagram of an electronic device used to implement the video processing method of an embodiment of the present disclosure. The electronic device can be a deployment device or a proxy device as described above. The electronic device is intended to represent various forms of digital computers, such as laptop computers, desktop computers, workstations, personal digital assistants, servers, blade servers, mainframe computers, and other suitable computers. The electronic device can also represent various forms of mobile apparatuses, such as personal digital processing, cellular telephone, smart phone, wearable device, and other similar computing apparatuses. The parts, connections and relationships thereof, and functions thereof shown herein are merely examples and are not intended to limit the implementation of the present disclosure described and/or claimed herein.

As shown in FIG. 8, the electronic device can include: one or more processors 801, memory 802, and interfaces for connecting various parts, including a high-speed interface and a low-speed interface. The various parts are connected to each other using different buses and can be installed on a common motherboard or installed in other ways as needed. The processor can process instructions executed within electronic device, including instructions stored in the memory or on the memory to display graphical information of the GUI on an external input/output device, (such as display device coupled to an interface). In other implementations, a plurality of processors and/or a plurality of buses can be used with a plurality of memories, if desired. Similarly, a plurality of electronic devices can be connected, each device providing a part of necessary operations (e.g., as a server array, a group of blade servers or a multiprocessor system). In FIG. 8, one processor 801 is taken as an example.

The memory 802 is a non-transitory computer-readable storage medium provided by the present disclosure. Wherein, the memory stores instructions executable by at least one processor to cause the at least one processor to execute the video processing method provided by the present disclosure. The non-transitory computer-readable storage medium of the present disclosure stores computer instructions for causing a computer to execute the video processing method provided by the present disclosure.

The memory 802, as a non-transitory computer-readable storage medium, can be used to store non-transitory software programs, non-transitory computer-executable programs, and modules, such as program instructions/modules (e.g., the splitting module, the encoding module, the video processing module and other modules, shown in FIG. 7) corresponding to the video processing method in the embodiment of the present disclosure. The processor 801 executes various functional applications and data processing of the server, i.e., implementing the video processing method in the above-described method embodiment, by executing non-transient software programs, instructions, and modules stored in the memory 802.

The memory 802 can include a storage program area and a storage data area; wherein the storage program area can store an operating system and an application program required by at least one function, and the storage data area can store data or the like created based on the usage of the electronic device. In addition, the memory 802 can include high speed random access memory, and can also include non-transitory memory, such as at least one magnetic disk storage component, a flash memory component, or other non-transitory solid state storage components. In some embodiments, the memory 802 optionally includes memories set remotely provided relative to the processor 801, and these remote memories can be connected to the electronic device via a network. Instances of the above network include, but are not limited to, the Internet, an intranet, a local area network, a mobile communication network, and combinations thereof.

The electronic device for the video processing method can further include: an input device 803 and an output device 804. The processor 801, the memory 802, the input device 803, and the output device 804 can be connected by a bus or other means. In FIG. 8, the connection through a bus is taken as an example.

The input device 803, such as a touch screen, a keypad, a mouse, a trackpad, a touchpad, an indication rod, one or more mouse buttons, a trackball, a joystick, etc., can receive input numeric or character information, and generate key signal inputs related to user settings and functional control of the electronic device. The output device 804 can include a display device, an auxiliary lighting apparatus (e.g., an LED), a tactile feedback apparatus (e.g., a vibration motor), etc. The display device can include, but is not limited to, a liquid crystal display (LCD), a light emitting diode (LED) display, and a plasma display. In some implementations, the display device can be a touch screen.

Various implementations of the system and technology described herein can be implemented in a digital electronic circuit system, an integrated circuit system, an application specific ASIC (application specific integrated circuit), computer hardware, firmware, software, and/or combination thereof. These various implementations can include: implementing in one or more computer programs, which can be executed and/or interpreted on a programmable system including at least one programmable processor. The programmable processor can be a dedicated or general-purpose programmable processor that can receive data and instructions from a storage system, at least one input device, and at least one output device, and transmit the data and instructions to the storage system, the at least one input device, and the at least one output device.

These computing programs (also referred to as program, software, software applications, or code) include machine instructions of a programmable processor, and these computer programs can be implemented using a high-level process and/or an object-oriented programming language, and/or an assembly/machine language. As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to the programmable processor, including the machine-readable medium that receives machine instructions as machine-readable signals. The term "machine-readable signal" refers to any signal used to provide machine instructions and/or data to a programmable processor.

In order to provide the interaction with a user, the system and technology described herein can be implemented on a computer that has: a display apparatus (e.g., a CRT (cathode ray tube) or an LCD (liquid crystal display) monitor) for displaying information to the user; and a keyboard and a pointing apparatus (e.g., a mouse or a trackball) through which the user can provide input to the computer. Other types of apparatus can also be used to provide the interaction with a user: for example, the feedback provided to the user can be any form of sensory feedback (e.g., visual feedback, auditory feedback, or tactile feedback); and input from the user can be received in any form (including acoustic input, voice input, or tactile input).

The system and technology described herein can be implemented in a computing system (e.g., as a data server) that includes a background part, or be implemented in a computing system (e.g., an application server) that includes a middleware part, or be implemented in a computing system (e.g., a user computer having a graphical user interface or a web browser, through which a user can interact with implementations of the system and technology described herein) that includes a front-end part, or be implemented in a computing system that includes any combination of such background part, middleware part, or front-end part. The parts of the system can be interconnected by any form or medium of the digital data communication (e.g., a communication network). Examples of the communication network include: a Local Area Networks (LAN), a Wide Area Network (WAN), and the Internet.

A computer system can include a client and a server. The client and server are typically remote from each other and typically interact through a communication network. The relationship of the client and the server is generated by computer programs running on respective computers and having a client-server relationship with each other. The server can be a cloud server, also called a cloud computing server or a cloud host, which is a host product in a cloud computing service system, to solve defects of high management difficulty and weak business expansibility in the traditional physical host and virtual private server (VPS) service. The server can also be a server of a distributed system, or a server combined with a block chain.

Adopting the present disclosure, a plurality of first video frames can be acquired, and fine-grained splitting is performed on the plurality of first video frames to obtain a plurality of second video frames. Feature encoding can be performed on the plurality of second video frames according to multi-mode information related to the plurality of second video frames, to obtain feature fusion information for characterizing fusion of the multi-mode information. Similarity matching is performed on the plurality of second video frames according to the feature fusion information, and a target video can be obtained according to a result of the similarity matching. Adopting the present disclosure, since the feature encoding can be performed based on the multi-mode information to obtain information containing more details of the video content, the target video obtained according to the similarity matching is more precise, thereby improving the accuracy of the video splitting.

It should be understood that various forms of processes shown above can be used to reorder, add, or delete steps. For example, respective steps recorded in the present disclosure can be executed in parallel, or can be executed sequentially, or can be executed in a different order, so long as the desired result of the technical solution provided in the present disclosure can be achieved, no limitation is made herein.

The above-mentioned specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement, and the like made within the spirit and principle of the present disclosure shall be included within the protection scope of the present disclosure.

What is claimed is:

1. A video processing method, comprising:
    acquiring a plurality of first video frames, and performing fine-grained splitting on the plurality of first video frames to obtain a plurality of second video frames;
    performing feature encoding on the plurality of second video frames according to multi-mode information related to the plurality of second video frames, to obtain feature fusion information for characterizing fusion of the multi-mode information;
    performing similarity matching on the plurality of second video frames according to the feature fusion information, and obtaining a target video according to a result of the similarity matching;
    identifying the multi-mode information from the plurality of second video frames according to a pre-trained first neural network model,
    wherein the identifying the multi-mode information from the plurality of second video frames according to the pre-trained first neural network model comprises:
        identifying knowledge map information according to a knowledge map extractor in the first neural network model;

identifying text information according to a text extractor in the first neural network model;
identifying audio information according to an audio extractor in the first neural network model;
identifying hue information according to a hue extractor in the first neural network model;
identifying object information according to an object extractor in the first neural network model;
identifying action information according to an action extractor in the first neural network model; and
wherein the multi-mode information comprises: at least one of the knowledge map information, the text information, the audio information, the hue information, the object information, and the action information;
distinguishing respective types of information in the multi-mode information according to a second neural network model;
identifying time sequence information related to the multi-mode information according to a third neural network model; and
fusing output results of the first neural network model, the second neural network model, and the third neural network model to obtain the feature fusion information.

2. The method of claim 1, wherein the acquiring the plurality of first video frames, and performing the fine-grained splitting on the plurality of first video frames to obtain the plurality of second video frames comprises:
performing the fine-grained splitting on the plurality of first video frames according to a parameter for characterizing shot and color transformation to obtain the plurality of second video frames.

3. The method of claim 1, wherein the performing the feature encoding on the plurality of second video frames according to the multi-mode information related to the plurality of second video frames, to obtain the feature fusion information for characterizing the fusion of the multi-mode information, comprises:
performing feature extraction and feature fusion processing on the plurality of second video frames according to the multi-mode information to obtain the feature fusion information.

4. The method of claim 1, wherein the performing the similarity matching on the plurality of second video frames according to the feature fusion information, and obtaining the target video according to the result of the similarity matching, comprises:
scoring similarities of the plurality of second video frames according to the feature fusion information, and taking a result of the scoring as the result of the similarity matching; and
in a case that the result of the similarity matching is that adjacent video frames for a same event content are similar, performing video merging on the adjacent video frames until completing merging of the plurality of second video frames according to the adjacent video frames, respectively, and obtaining the target video according to a result of the video merging.

5. An electronic device, comprising:
at least one processor; and
a memory communicatively connected to the at least one processor; wherein,
the memory stores instructions executable by the at least one processor, and the instructions are executed by the at least one processor to enable the at least one processor to perform operations of:
acquiring a plurality of first video frames, and performing fine-grained splitting on the plurality of first video frames to obtain a plurality of second video frames;
performing feature encoding on the plurality of second video frames according to multi-mode information related to the plurality of second video frames, to obtain feature fusion information for characterizing fusion of the multi-mode information;
performing similarity matching on the plurality of second video frames according to the feature fusion information, and obtaining a target video according to a result of the similarity matching;
identifying the multi-mode information from the plurality of second video frames according to a pre-trained first neural network model,
wherein when the instructions are executed by the at least one processor to enable the at least one processor to identify the multi-mode information from the plurality of second video frames according to a pre-trained first neural network model, the instructions are executed by the at least one processor to enable the at least one processor to specifically perform operations of:
identifying knowledge map information according to a knowledge map extractor in the first neural network model;
identifying text information according to a text extractor in the first neural network model;
identifying audio information according to an audio extractor in the first neural network model;
identifying hue information according to a hue extractor in the first neural network model;
identifying object information according to an object extractor in the first neural network model;
identifying action information according to an action extractor in the first neural network model; and
wherein the multi-mode information comprises: at least one of the knowledge map information, the text information, the audio information, the hue information, the object information, and the action information;
distinguishing respective types of information in the multi-mode information according to a second neural network model;
identifying time sequence information related to the multi-mode information according to a third neural network model; and
fusing output results of the first neural network model, the second neural network model, and the third neural network model to obtain the feature fusion information.

6. The electronic device of claim 5, wherein when the instructions are executed by the at least one processor to enable the at least one processor to acquire the plurality of first video frames, and perform the fine-grained splitting on the plurality of first video frames to obtain the plurality of second video frames, the instructions are executed by the at least one processor to enable the at least one processor to specifically perform an operation of:
performing the fine-grained splitting on the plurality of first video frames according to a parameter for characterizing shot and color transformation to obtain the plurality of second video frames.

7. The electronic device of claim 5, wherein when the instructions are executed by the at least one processor to enable the at least one processor to perform the feature encoding on the plurality of second video frames according to the multi-mode information related to the plurality of second video frames, to obtain the feature fusion information for characterizing the fusion of the multi-mode information, the instructions are executed by the at least one processor to enable the at least one processor to specifically perform an operation of:

performing feature extraction and feature fusion processing on the plurality of second video frames according to the multi-mode information to obtain the feature fusion information.

8. The electronic device of claim 5, wherein when the instructions are executed by the at least one processor to enable the at least one processor to perform the similarity matching on the plurality of second video frames according to the feature fusion information, and obtain the target video according to the result of the similarity matching, the instructions are executed by the at least one processor to enable the at least one processor to specifically perform operations of:

scoring similarities of the plurality of second video frames according to the feature fusion information, and taking a result of the scoring as the result of the similarity matching; and in a case that the result of the similarity matching is that adjacent video frames for a same event content are similar, performing video merging on the adjacent video frames until completing merging of the plurality of second video frames according to the adjacent video frames, respectively, and obtaining the target video according to a result of the video merging.

9. A non-transitory computer-readable storage medium storing computer instructions, wherein, the computer instructions are used for causing a computer to perform operations of:

acquiring a plurality of first video frames, and performing fine-grained splitting on the plurality of first video frames to obtain a plurality of second video frames;

performing feature encoding on the plurality of second video frames according to multi-mode information related to the plurality of second video frames, to obtain feature fusion information for characterizing fusion of the multi-mode information;

performing similarity matching on the plurality of second video frames according to the feature fusion information, and obtaining a target video according to a result of the similarity matching;

identifying the multi-mode information from the plurality of second video frames according to a pre-trained first neural network model, wherein when the computer instructions are used for causing the computer to identify the multi-mode information from the plurality of second video frames according to a pre-trained first neural network model, the computer instructions are used for causing the computer to specifically perform operations of:

identifying knowledge map information according to a knowledge map extractor in the first neural network model;

identifying text information according to a text extractor in the first neural network model;

identifying audio information according to an audio extractor in the first neural network model;

identifying hue information according to a hue extractor in the first neural network model;

identifying object information according to an object extractor in the first neural network model;

identifying action information according to an action extractor in the first neural network model; and wherein the multi-mode information comprises: at least one of the knowledge map information, the text information, the audio information, the hue information, the object information, and the action information;

distinguishing respective types of information in the multi-mode information according to a second neural network model;

identifying time sequence information related to the multi-mode information according to a third neural network model; and fusing output results of the first neural network model, the second neural network model, and the third neural network model to obtain the feature fusion information.

10. The non-transitory computer-readable storage medium of claim 9, wherein when the computer instructions are used for causing the computer to acquire the plurality of first video frames, and perform the fine-grained splitting on the plurality of first video frames to obtain the plurality of second video frames, the computer instructions are used for causing the computer to specifically perform an operation of:

performing the fine-grained splitting on the plurality of first video frames according to a parameter for characterizing shot and color transformation to obtain the plurality of second video frames.

11. The non-transitory computer-readable storage medium of claim 9, wherein when the computer instructions are used for causing the computer to perform the feature encoding on the plurality of second video frames according to the multi-mode information related to the plurality of second video frames, to obtain the feature fusion information for characterizing the fusion of the multi-mode information, the computer instructions are used for causing the computer to specifically perform an operation of:

performing feature extraction and feature fusion processing on the plurality of second video frames according to the multi-mode information to obtain the feature fusion information.

12. The non-transitory computer-readable storage medium of claim 9, wherein when the computer instructions are used for causing the computer to perform the similarity matching on the plurality of second video frames according to the feature fusion information, and obtain the target video according to the result of the similarity matching, the computer instructions are used for causing the computer to specifically perform operations of:

scoring similarities of the plurality of second video frames according to the feature fusion information, and taking a result of the scoring as the result of the similarity matching; and in a case that the result of the similarity matching is that adjacent video frames for a same event content are similar, performing video merging on the adjacent video frames until completing merging of the plurality of second video frames according to the adjacent video frames, respectively, and obtaining the target video according to a result of the video merging.

* * * * *